United States Patent
Gong et al.

(10) Patent No.: US 9,257,076 B2
(45) Date of Patent: Feb. 9, 2016

(54) PIXEL DRIVING METHOD AND LIQUID CRYSTAL DISPLAY IMPLEMENTING THE SAME

(71) Applicant: AU Optronics Corporation, Hsin-Chu (TW)

(72) Inventors: Shin-Mei Gong, Hsin-Chu (TW);
Kun-Cheng Tien, Hsin-Chu (TW);
Ming-Huei Wu, Hsin-Chu (TW);
Jen-Yang Chung, Hsin-Chu (TW);
Wei-Chun Wei, Hsin-Chu (TW);
Chien-Huang Liao, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 26 days.

(21) Appl. No.: 14/291,461

(22) Filed: May 30, 2014

(65) Prior Publication Data
US 2015/0042691 A1 Feb. 12, 2015

(30) Foreign Application Priority Data
Aug. 6, 2013 (TW) .............................. 102128136 A (51) Int. Cl.
*G02F 1/133* (2006.01)
*G09G 3/34* (2006.01)
*G09G 3/36* (2006.01)

(52) U.S. Cl.
CPC .............. *G09G 3/3413* (2013.01); *G02F 1/133* (2013.01); *G09G 3/3648* (2013.01); *G09G 2320/0626* (2013.01)

(58) Field of Classification Search
CPC ........... G02F 1/1333; G09G 3/36; G09G 5/10
USPC ..................................... 345/690; 349/39, 187
See application file for complete search history.

(56) References Cited

U.S. PATENT DOCUMENTS

| | | | |
|---|---|---|---|
| 8,279,385 B2 | 10/2012 | Kim et al. | |
| 8,330,906 B2 | 12/2012 | Hashimoto et al. | |
| 8,373,633 B2 | 2/2013 | Lai et al. | |
| 2007/0064164 A1 | 3/2007 | Tasaka et al. | |
| 2008/0136985 A1* | 6/2008 | Hsieh et al. | 349/39 |
| 2009/0267963 A1* | 10/2009 | Kawashima et al. | 345/690 |
| 2011/0242443 A1 | 10/2011 | Choi et al. | |
| 2012/0086743 A1 | 4/2012 | Shiomi | |
| 2012/0113379 A1* | 5/2012 | Tomizawa et al. | 349/187 |
| 2012/0281168 A1 | 11/2012 | Shimoshikiryoh et al. | |
| 2013/0120469 A1 | 5/2013 | Tien et al. | |
| 2013/0293822 A1 | 11/2013 | Chung et al. | |

FOREIGN PATENT DOCUMENTS

| | | |
|---|---|---|
| CN | 101501561 | 8/2009 |
| CN | 102460556 | 5/2012 |
| TW | I368210 | 7/2012 |

* cited by examiner

*Primary Examiner* — Nicholas Lee
*Assistant Examiner* — Abdul-Samad A Adediran
(74) *Attorney, Agent, or Firm* — WPAT, PC; Justin King (57) ABSTRACT

A pixel driving method is adapted for a liquid crystal display. Each pixel includes a first sub-pixel and a second sub-pixel, in which the first sub-pixel and the second sub-pixel each includes a first display region and a second display region. The pixel driving method includes providing a first voltage to the first displaying region of the first sub-pixel and the second sub-pixel; providing a second voltage to the second displaying region of the first sub-pixel and a third voltage to the second displaying region of the second sub-pixel; and when the provided first voltage is larger than a predetermined voltage, providing the second voltage so that the provided second voltage is smaller than the provided third voltage.

10 Claims, 10 Drawing Sheets

PIXEL DRIVING METHOD AND LIQUID CRYSTAL DISPLAY IMPLEMENTING THE SAME

RELATED APPLICATIONS

This application claims priority to Taiwan Application Serial Number 102128136 filed Aug. 6, 2013, which is herein incorporated by reference.

BACKGROUND

1. Technical Field

The present disclosure relates to a pixel driving method. More particularly, the present disclosure relates to a pixel driving method for pixels at a high gray scale range.

2. Description of Related Art

The use of various liquid crystal display products have become commonplace in recent times. However, the conventional liquid crystal display still has the problems of a narrow viewing angle, i.e., the image is partially white when viewed at an oblique angle on both sides of the liquid crystal display, so that the screen of liquid crystal display generates a color washout situation. The conventional approach is to divide each pixel of the liquid crystal display into a red sub-pixel, green sub-pixel and blue sub-pixel, and each sub-pixel is divided into two display regions. Through a pixel circuit design that enables two display regions of each sub-pixel to have different pixel voltages such that the luminance of one display region is different from the luminance of another display region, the quality of the image is improved.

However, although this approach achieves white balance compensation when users watch the liquid crystal display at oblique viewing angles, if it is desired to display a high gray scale, the degree to which the luminance of the blue sub-pixel decreases is much greater than the decrease in the luminance of the red sub-pixel and green sub-pixel. Accordingly, when users watch the liquid crystal display at oblique viewing angles, the image quality is poor since the display image is partially green.

Figure 1:
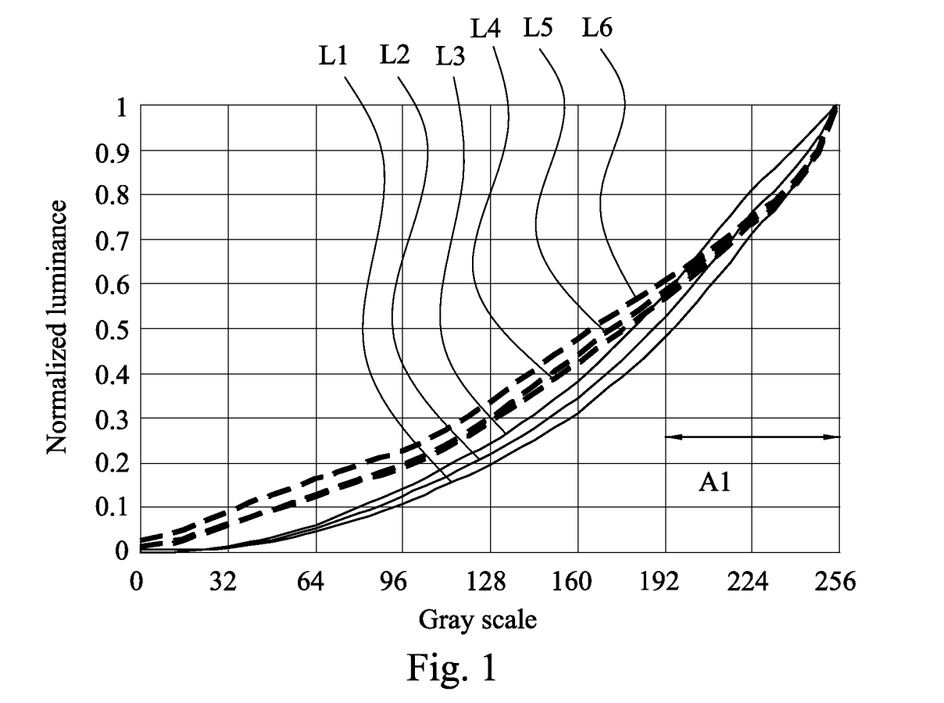
FIG. 1 is a diagram illustrating a relation between gray scales and normalized luminance of a conventional red sub-pixel, green sub-pixel, and blue sub-pixel at an oblique view (45 degrees) and a direct view.

Referring to FIG. 1, FIG. 1 is a diagram illustrating a relation between gray scales and normalized luminance of a conventional red sub-pixel, green sub-pixel, and blue sub-pixel at an oblique view (45 degrees) and direct view. There are six curves L1, L2, L3, L4, L5, and L6 in FIG. 1. The curves L1, L2, and L3 represent relations between normalized luminance of the red sub-pixel, green sub-pixel, and blue sub-pixel respectively at a direct view. The curves L4, L5, and L6 represent relations between normalized luminance of the red sub-pixel, green sub-pixel, and blue sub-pixel respectively at an oblique view.

As shown in FIG. 1, when a pixel has a gray scale value larger than 192, i.e., the pixel has a gray scale value within a range A1, the curve L6 (blue sub-pixel) at an oblique view is more concave than the curve L3 at a direct view. In other words, the luminance of the blue sub-pixel at an oblique view is lower than the luminance of the blue sub-pixel at a direct view. On the other hand, the curve L4 (red sub-pixel) at oblique view is less concave than the curve L3 at a direct view. The curve L5 (green sub-pixel) at an oblique view is also less concave than the curve L2 at a direct view.

Figure 2:
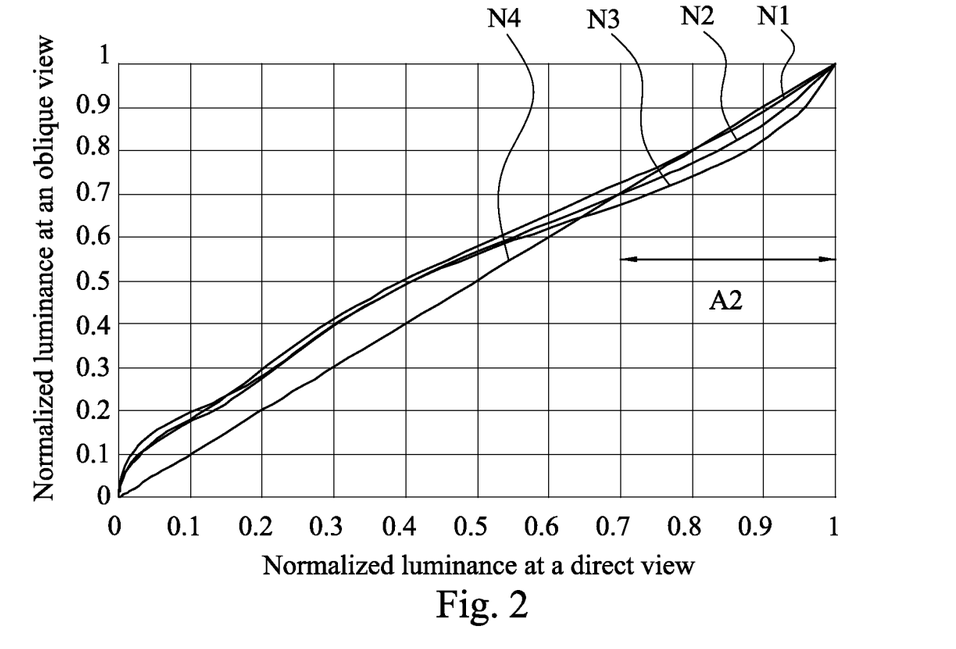
FIG. 2 is a diagram illustrating a relation between normalized luminance at an oblique view (45 degrees) and normalized luminance at a direct view for a conventional red sub-pixel, green sub-pixel, and blue sub-pixel.

Referring to FIG. 1 and FIG. 2, FIG. 2 is a diagram illustrating a relation between normalized luminance at an oblique view (45 degrees) and normalized luminance at a direct view for a conventional red sub-pixel, green sub-pixel, and blue sub-pixel, in which the curves N1, N2, and N3 represent the red sub-pixel, the green sub-pixel, and the blue sub-pixel, respectively. The reference line N4 represents no color washout effect. As shown in FIG. 2, when the normalized luminance at direct view is larger than 0.7, i.e., when the pixel has a gray scale value within a range A2, the difference between the curve N3 (blue sub-pixel) and the reference line N4 is larger than the difference between the curve N1 (red sub-pixel) and the reference line N4, and the difference between the curve N2 (green sub-pixel) and the reference line N4. In other words, when the pixel has a large gray scale value, the reduction of the luminance of the blue sub-pixel is larger than the reduction of the luminance of the red sub-pixel and green sub-pixel at an oblique view (45 degrees) causing the luminance of the pixel to appear to lack blue. Therefore, when the pixel has a large gray scale value, a condition in which the image is partially green at an oblique view (45 degrees) occurs.

SUMMARY

One aspect of the present disclosure is to provide a pixel driving method configured for driving pixels. One of the pixels includes a first sub-pixel and a second sub-pixel. Each of the first sub-pixel and the second sub-pixel includes a first display region and a second display region. The pixel driving method includes providing a first voltage to the first display regions of the first sub-pixel and the second sub-pixel; providing a second voltage to the second display region of the first sub-pixel and providing a third voltage to the second display region of the second sub-pixel, in which the second voltage is substantially equal to the third voltage when the first voltage is smaller than a predetermined voltage; and adjusting the second voltage such that the second voltage is smaller than the third voltage when the first voltage is larger than or equal to the predetermined voltage.

Another aspect of the present disclosure is to provide a liquid crystal pixel array. The liquid crystal pixel array is electrically coupled to several gate lines and several data lines. The liquid crystal pixel array is disposed close to a liquid crystal layer. The liquid crystal pixel array includes several pixels. Each of pixels includes a first sub-pixel and a second sub-pixel. The first sub-pixel is configured for displaying a blue color and includes a first display electrode, a second display electrode, and a first switch unit. The first display electrode is coupled to the liquid crystal layer. The second display electrode is coupled to the liquid crystal layer and a first capacitor. When an Nth gate line is enabled, a first voltage and a second voltage are provided to the first display electrode and the second display electrode of the first sub-pixel respectively according to a first data voltage received by a corresponding data line. The first switch unit is coupled to the liquid crystal layer and the second display electrode. When an (N+1)th gate line is enabled, the charges of the second display electrode of the first sub-pixel are shared. The second sub-pixel is configured for displaying red or green and includes a first display electrode, a second display electrode, and a second switch unit. The first display electrode is coupled to the liquid crystal layer. The second display electrode is coupled to the liquid crystal layer and a second capacitor. When the Nth gate line is enabled, another first voltage and a third voltage are provided to the first display electrode and the second display electrode of the second sub-pixel respectively according to a second data voltage received by the corresponding data line. The second switch unit is coupled to a third capacitor and the second display electrode. When the (N+1)th gate line is enabled, the charges of the second display electrode of the second sub-pixel are shared. When the first voltage is smaller than a predetermined voltage, the second voltage is substantially equal to the third voltage. When the first voltage is larger than or equal to the predetermined voltage, the first switch unit is conducted and the second voltage is adjusted such that the second voltage is smaller than the third voltage.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 3:
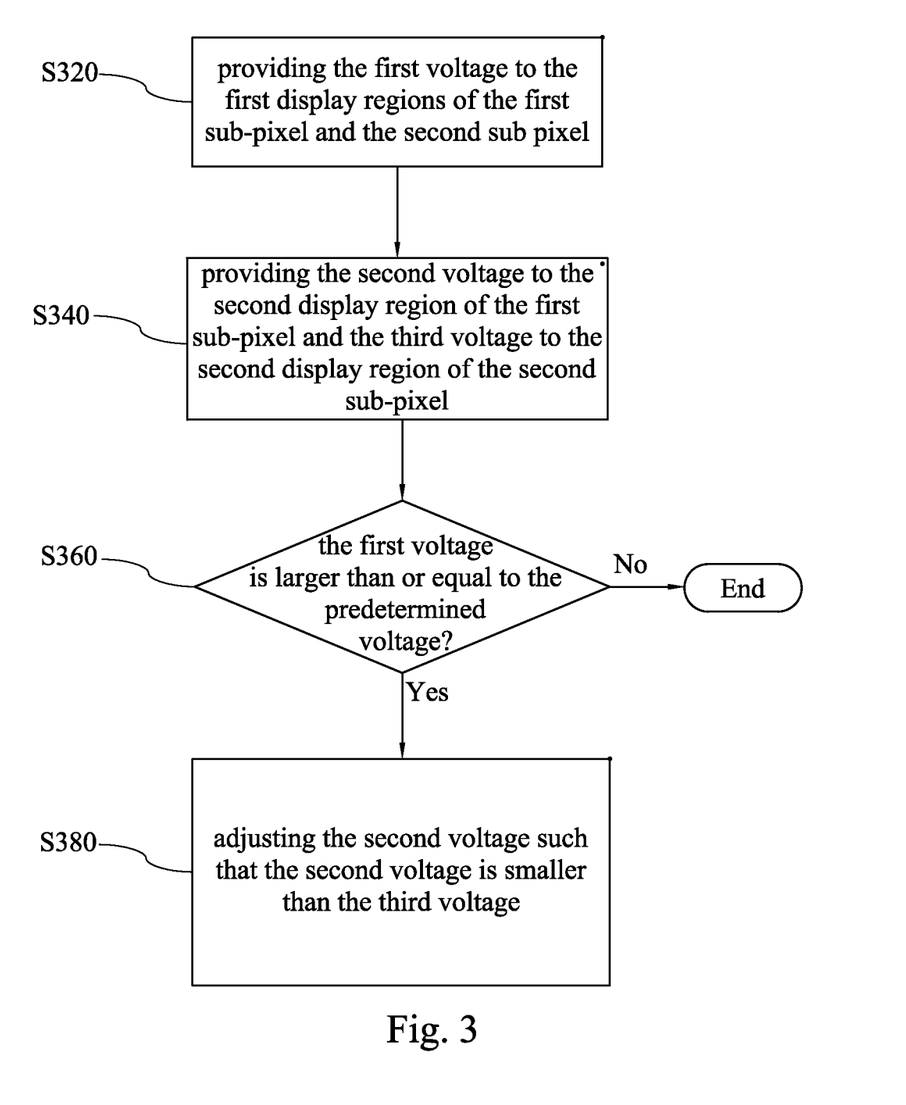
FIG. 3 is a flowchart illustrating a pixel driving method according to one embodiment of the present disclosure.
Figure 4:
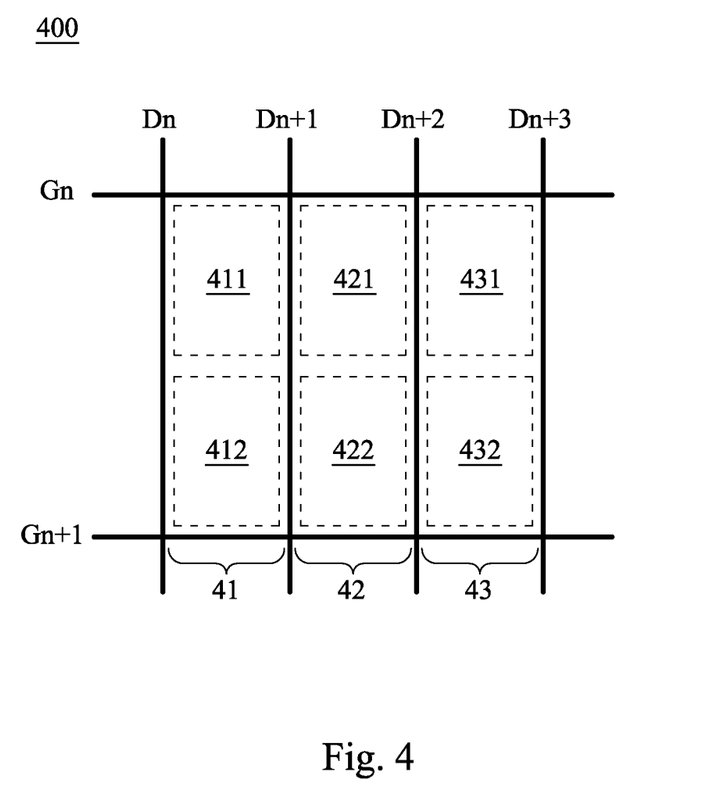
FIG. 4 is a schematic diagram illustrating a pixel driven by the pixel driving method of FIG. 3 according to one embodiment of the present disclosure.

References are made to FIG. 3 and FIG. 4. FIG. 3 is a flowchart illustrating a pixel driving method according to one embodiment of the present disclosure. The pixel driving method is configured for driving several pixels of a display panel (not shown). FIG. 4 is a schematic diagram illustrating a pixel driven by the pixel driving method of FIG. 3 according to one embodiment of the present disclosure. As shown in FIG. 4, the pixel 400 includes a blue sub-pixel 41, a red sub-pixel 42, and a green sub-pixel 43. However, the number of the sub-pixels is not limited thereto. In order to compensate for color washout at an oblique view, the foregoing sub-pixels can be divided into a first display region and a second display region for receiving driving pixel voltages individually. In the present embodiment, the blue sub-pixel 41 includes a first display region 411 and a second display region 412, the red sub-pixel 42 includes a first display region 421 and a second display region 422, and the green sub-pixel 43 includes a first display region 431 and a second display region 432. Then, through different pixel circuit designs or driving approaches, the first display region and the second display region of each of the sub-pixels can have different pixel voltages. In other words, the luminance of the first display region may be different from the luminance of the second display region, and hence, color washout of an image at an oblique view can be reduced.

As shown in FIG. 3, the pixel driven by the pixel driving method includes a first sub-pixel and a second sub-pixel. The first sub-pixel includes a first display region and a second display region, for example, the first sub-pixel can be the blue sub-pixel 41 as shown in FIG. 4. The second sub-pixel also includes a first display region and a second display region. For example, the second sub-pixel can be the red sub-pixel 42 or the green sub-pixel 43 shown in FIG. 4. In operation S320, a first voltage is provided to the first display regions of the first sub-pixel and the second sub-pixel. Next, in operation S340, a second voltage is provided to the second display region of the first sub-pixel and a third voltage is provided to the second display region of the second sub-pixel. Taking the pixel 400 in FIG. 4 as an example, a data driving circuit (not shown in FIG. 4) can provide data voltages to the blue sub-pixel 41, the red sub-pixel 42, and the green sub-pixel 43 through a data line Dn, a data line Dn+1, and a data line Dn+2, respectively. The first voltages are formed on the first display region 411 of the blue sub-pixel 41, the first display region 421 of the red sub-pixel 42, and the first display region 431 of the green sub-pixel 43 by the data voltages. Moreover, the second voltage is formed on the second display region 412 of the blue sub-pixel 41, and the third voltages are formed on the second display region 422 of the red sub-pixel 42 and the second display region 432 of the green sub-pixel 43 by the data voltages. Therefore, the first display region and the second display region of each sub-pixel have different pixel voltages corresponding to each gray scale.

Subsequently, in operation S360, a determination is made as to whether the first voltage provided to the first display regions of the first sub-pixel and the second sub-pixel is larger than or equal to a predetermined voltage. In other words, a determination is made as to whether the pixel has a large gray scale value. When the provided first voltage is smaller than the predetermined voltage, the voltages are kept normal without adjustment. At this moment, the second voltage is substantially equal to the third voltage. Specifically, the second display region 412 of the blue sub-pixel 41 and the second display regions 422, 432 of the red sub-pixel 42 and the green sub-pixel 43 have substantially equivalent gray scale values. When the provided first voltage is larger than or equal to the predetermined voltage, operation S380 is executed. In operation S380, the second voltage is adjusted such that the second voltage (e.g., the voltage provided to the second display region 412) provided to the first sub-pixel (e.g., the blue sub-pixel 41) is smaller than the third voltage (e.g., the voltage provided to the second display region 422 or the second display region 432) provided to the second sub-pixel (e.g., the red sub-pixel 42 or the green sub-pixel 43) in which the second sub-pixel has the same first voltage as the first sub-pixel. In one embodiment, if it is assumed that the gray scale value of the pixel includes 8 bits, i.e., the gray scale value is between 0 and 255, then a large gray scale pixel represents its gray scale value that is larger than or equal to 160. In other words, the predetermined voltage can be the voltage provided when the gray scale value is approximately equal to 160.

In other words, when the pixel 400 has a large gray scale value and the pixel voltage on the first display region 411 of the blue sub-pixel 41 is equivalent to the pixel voltage on the first display region 421 of the red sub-pixel 42 or the first display region 431 of the green sub-pixel 43, the second voltage provided to the blue sub-pixel 41 is adjusted such that the pixel voltage on the second display region 412 of the blue sub-pixel 41 is smaller than the pixel voltage on the second display region 422 of the red sub-pixel 42 or the second display region 432 of the green sub-pixel 43.

Furthermore, when the first voltage provided to the first display region of the first sub-pixel (e.g., the blue sub-pixel) and the second sub-pixel (e.g., the red sub-pixel or the green sub-pixel) is larger than or equal to the predetermined voltage, the pixel driving method is configured to make the second voltage provided to the second display region of the first sub-pixel increase at a different rate than and the increase of the third voltage provided to the second display region of the second sub-pixel, while the first voltage increases gradually. In other words, when the first voltage increases, the pixel driving method is configured to provide the second voltage to the second display region of the first sub-pixel so that it is smaller than the third voltage which is provided to the second display region of the second sub-pixel, such that the luminance provided from the second display region of the first sub-pixel at the oblique viewing angle is reduced. Accordingly, the first sub-pixel is unable to provide a maximum luminance when the first sub-pixel has the highest gray scale value.

Generally, controlling the first sub-pixel so that is unable to provide a maximum luminance when the first sub-pixel has the highest gray scale value is such that the reduction of the normalized luminance of the first sub-pixel is minimized, so that the difference between the normalized luminance of the first sub-pixel and the normalized luminance of the second sub-pixel is reduced. Accordingly, the concave of the curve N3 in the range A2 in FIG. 2 can be avoided, such that a condition in which the image that is greenish at an oblique viewing angle can be improved.

Figure 5:
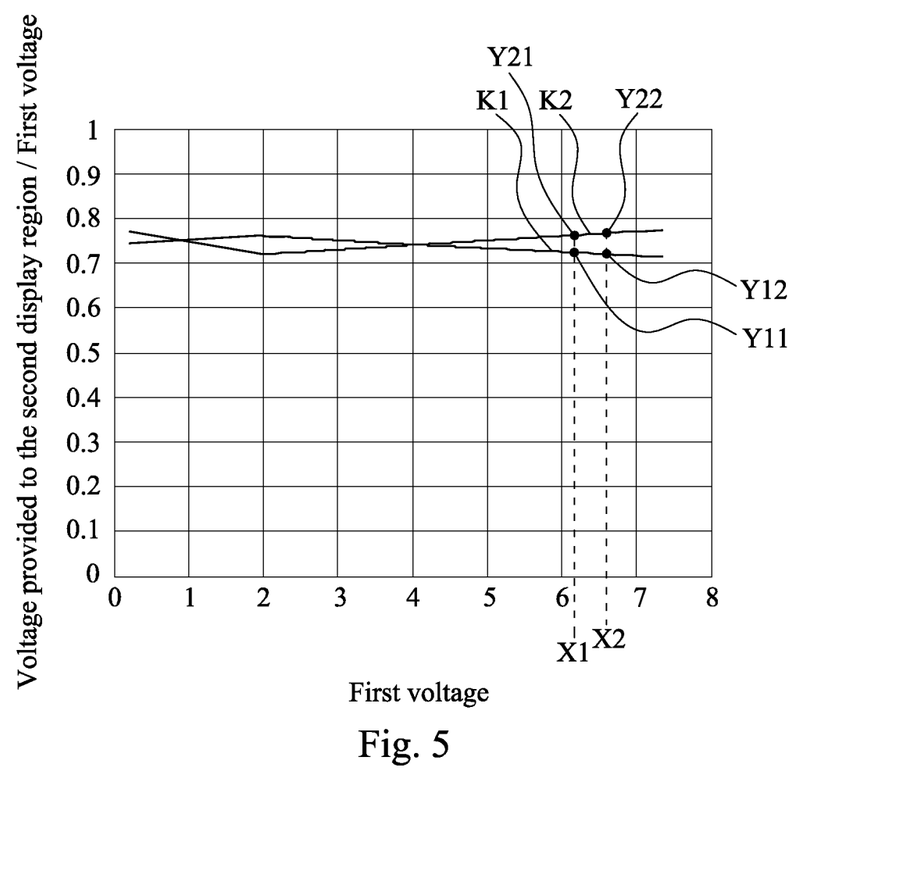
FIG. 5 is a diagram illustrating a relation between a first voltage and a second voltage according to one embodiment of the present disclosure.

Referring to FIG. 3 and FIG. 5, FIG. 5 is a curve diagram illustrating a relation between the first voltage and the second voltage and a relation between the first voltage and the third voltage according to one embodiment of the present disclosure. The x-axis represents the first voltage provided to the first display regions of the first sub-pixel and the second sub-pixel. The y-axis represents the voltage divided by the first voltage, in which the voltage is provided to the second display region of the first sub-pixel and the second sub-pixel (i.e., the second voltage provided to the first sub-pixel and the third voltage provided to the second sub-pixel). The curve K1 represents the relation between the second voltage provided to the first sub-pixel (e.g., the blue sub-pixel 41) and the first voltage provide to first sub-pixel. The curve K2 represents the relation between the third voltage provided to the second sub-pixel (e.g., the red sub-pixel 42 or the green sub-pixel 43) and the first voltage provided to the second sub-pixel.

As shown in FIG. 5, the vertical coordinate represents the ratio value of the voltage of the second display region (the second voltage and the third voltage) to the voltage of the first display region (the first voltage). The slope M2 of the curve K2 represents the change of the ratio value of the third voltage provided to the second sub-pixel to the first voltage when the first voltage has a variation. The slope M1 of the curve K1 represents the change of the ratio value of the second voltage provided to the first sub-pixel to the first voltage when the first voltage has the same variation. When the horizontal coordinate increases, a large difference between the slope M2 of the curve K2 and the slope M1 of the curve K1 indicates that the second voltage provided to the second display region of the first sub-pixel is smaller the third voltage provided to the second display region of the second sub-pixel.

When the first voltage provided to the first sub-pixel and the second sub-pixel is larger than or equal to the predetermined voltage, the slope M2 of the curve K2 can be obtained by setting two points x2 and x1 on the horizontal coordinate and setting two points y22 and y21 on the vertical coordinate of the curve K2 corresponding to points x2 and x1. The slope M2 of the curve K2 can be represented as:

$$M2 = \frac{(y22 - y21)}{(x2 - x1)},$$

in which y22 represents the ratio value of the third voltage provided to the second sub-pixel to the first voltage when the first voltage is x2, and y21 represents the ratio value of the third voltage provided to the second sub-pixel to the first voltage when the first voltage is x1. Similarly, the slope M1 of the curve K1 can be obtained by setting two points x2 and x1 on the horizontal coordinate and setting two points y12 and y11 on the vertical coordinate of the curve K1 corresponding to point x2 and x1. The slope M1 of the curve K1 can be represented as:

$$M1 = \frac{(y12 - y11)}{(x2 - x1)},$$

in which y12 represents the ratio value of the second voltage provided to the second sub-pixel to the first voltage when the first voltage is x2, and y11 represents the ratio value of the second voltage provided to the second sub-pixel to the first voltage when the first voltage is x1.

Therefore, when x2 approaches x1, the slope M2 of the curve K2 and the slope M1 of the curve K1 can be obtained when the first voltage provided to the first sub-pixel and the second sub-pixel is x2. The difference between the slope M2 and the slope M1 can be represented as Dm=M2−M1. The larger this difference Dm, the greater the difference between the slope M2 and the slope M1. In other words, the second voltage provided to the second display region of the first sub-pixel (e.g., the blue sub-pixel) is smaller than the third voltage provided to second display region of the second sub-pixel (e.g., the red sub-pixel or the green sub-pixel), such that the luminance provided from the second display region of the first sub-pixel at an oblique view is reduced. Accordingly, the first sub-pixel fails to provide the maximum luminance while the first sub-pixel has the highest gray scale value such that the reduction of the normalized luminance of the first sub-pixel is reduced, i.e., the difference between the normalized luminance of the first sub-pixel and the normalized luminance of the second sub-pixel is reduced, such that a condition in which the image that is partially yellow-green at an oblique view can be improved.

Figure 6:
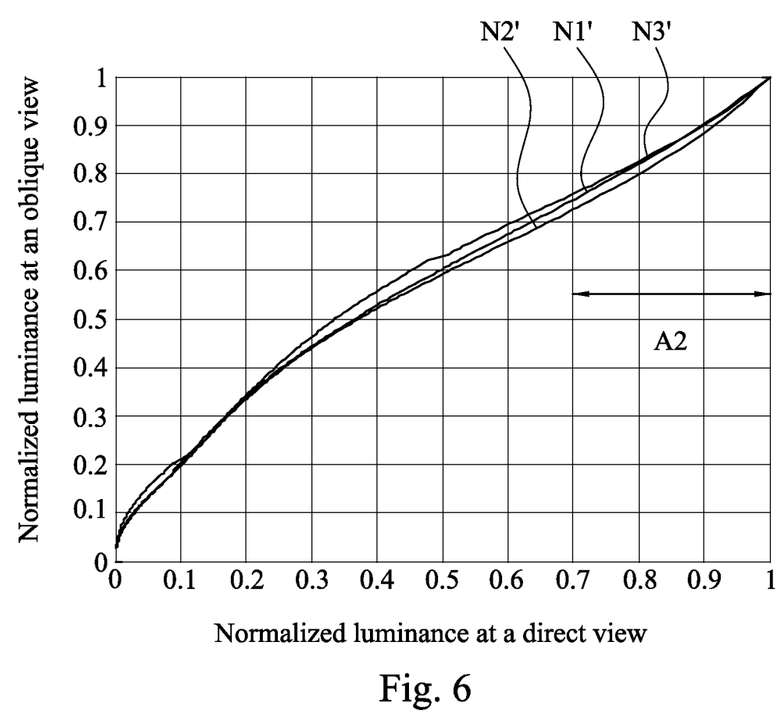
FIG. 6 is a diagram illustrating a relation between normalized luminance at an oblique view (45 degrees) and normalized luminance at a direct view for a red sub-pixel, green sub-pixel, and blue sub-pixel which are driven by the pixel driving method.

Referring to FIG. 6, FIG. 6 is a diagram illustrating a relation between normalized luminance at an oblique view (45 degrees) and normalized luminance at a direct view for a red sub-pixel, green sub-pixel, and blue sub-pixel which are driven by the pixel driving method of FIG. 3, in which the curves N1', N2', and N3' represent the red sub-pixel, the green sub-pixel, and the blue sub-pixel, respectively. As shown in FIG. 6, comparing the curve N3' with the curve N3(the blue sub-pixel) in FIG. 2, the concave of the curve N3' is markedly improved within the range A2. Moreover, the difference between the curve N3' and the curves N1', N2' is smaller than the difference between the curve N3and the curves N1, N2in FIG. 2. In other words, a condition in which the image that is partially yellow-green is improved when the large gray scale pixels are driven by the pixel driving method.

In order to adjust the second voltage of the second display region of the first sub-pixel such that the second voltage is smaller than the third voltage of the second display region of the second sub-pixel when the first sub-pixel and the second sub-pixel have large gray scale values, the present disclosure provides a pixel circuit described in the following paragraphs. In one embodiment, the structure of the first sub-pixel configured for displaying a blue color is different from the structure of the second sub-pixel configured for displaying red color or green color.

Figure 7:
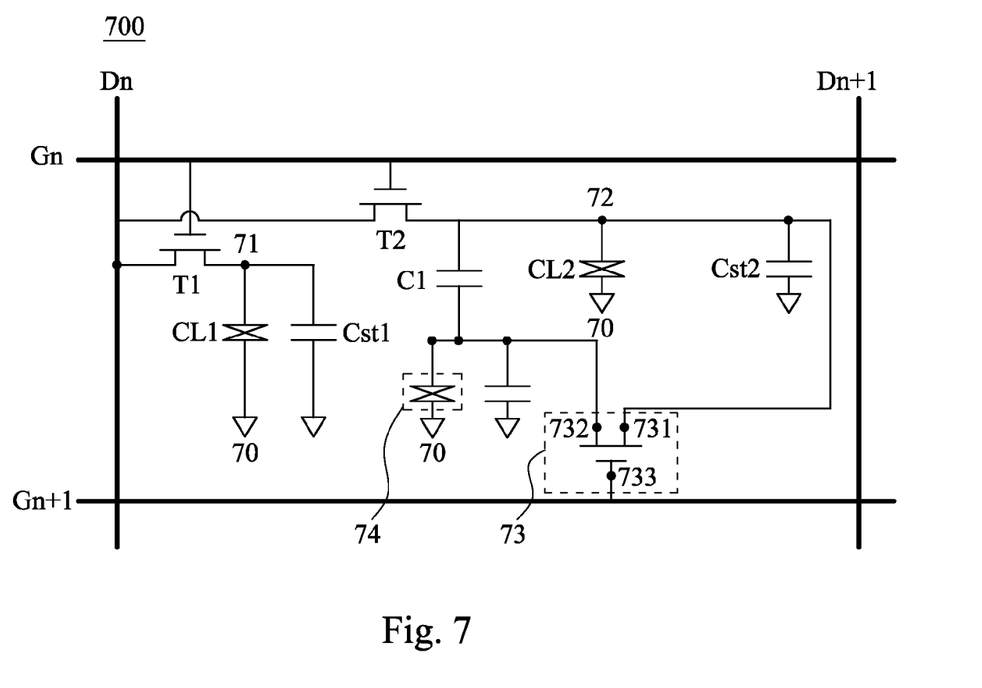
FIG. 7 is a schematic circuit diagram illustrating a sub-pixel according to one embodiment of the present disclosure.

Referring to FIG. 7, FIG. 7 is a schematic circuit diagram illustrating a sub-pixel 700 according to one embodiment of the present disclosure, in which the sub-pixel is configured for displaying a blue color. It is worth noted that the sub-pixel 700 is a sub-pixel of one pixel on a liquid crystal pixel array (not shown). The liquid crystal pixel array is electrically coupled to several gate lines and several data lines, and the liquid crystal pixel array is disposed close to a liquid crystal layer 70.

As shown in FIG. 7, the sub-pixel 700 includes a first display electrode 71, a second display electrode 72, a first switch unit 73, a transistor T1, and a transistor T2. The first display electrode 71 is disposed on the liquid crystal layer 70 so as to form the first display region. A liquid crystal capacitor CL1 is formed between the first display electrode 71 and the liquid crystal layer 70, i.e., the first display electrode 71 is coupled to the liquid crystal layer 70 through the liquid crystal capacitor CL1 . The first display electrode 71 is also electrically coupled to a storage capacitor Cst1. The second display electrode 72 is disposed on the liquid crystal layer 70 so as to form the second display region. A liquid crystal capacitor CL2 is formed between the second display electrode 72 and the liquid crystal layer 70, i.e., the second display electrode 72 is coupled to the liquid crystal layer 70 through the liquid crystal capacitor CL2 . The second display electrode 72 is also electrically coupled to a capacitor C1 and a storage capacitor Cst2.

The first switch unit 73 includes a first end 731, a second end 732, and a control end 733. The first end 731 of the first switch unit 73 is electrically coupled to the second display electrode 72 of the sub-pixel 700. The second end 732 is electrically coupled to the liquid crystal layer 70 and the capacitor C1. Moreover, in the present embodiment, the second end is further coupled to another electrode layer (not shown). A liquid crystal capacitor 74 is formed between the electrode layer and the liquid crystal layer 70. Accordingly, the second end 732 of the first switch unit 73 is coupled to the liquid crystal capacitor 74. The control end 733 is electrically coupled to the gate line Gn+1.

The source end of the transistor T1 is electrically coupled to the data line Dn. The drain end of the transistor T1 is electrically coupled to the first display electrode 71. The gate end of the transistor T1 is electrically coupled to the gate line Gn. The source end of the transistor T2 is electrically coupled to the data line Dn. The drain end of the transistor T2 is electrically coupled to the second display electrode 72 and the capacitor C1. The gate end of the transistor T2 is electrically coupled to the gate line Gn.

When the gate line Gn is enabled, the transistors T1 and T2 are turned on and receive a first data voltage through the data line Dn. Next, the first voltage is provided to the liquid crystal capacitor CL1 of the first display region (i.e., the liquid crystal capacitor CL1 coupled to the first display electrode 71) and the storage capacitor Cst1, and the second voltage is provided to the liquid crystal capacitor CL2 of the second display region (i.e., the liquid crystal capacitor CL2 coupled to the second display electrode 72) and the storage capacitor CsT2 according to the first data voltage.

When the gate line Gn+1 is enabled, the first switch unit 73 is turned on such that the second display electrode 72 is coupled to the liquid capacitor 74 and discharge is proceeded. Therefore, the charges stored in the liquid crystal capacitor CL2 and the storage capacitor Cst2 are shared into the liquid crystal capacitor 74, and the second voltage of the second display region is reduced.

Figure 8:
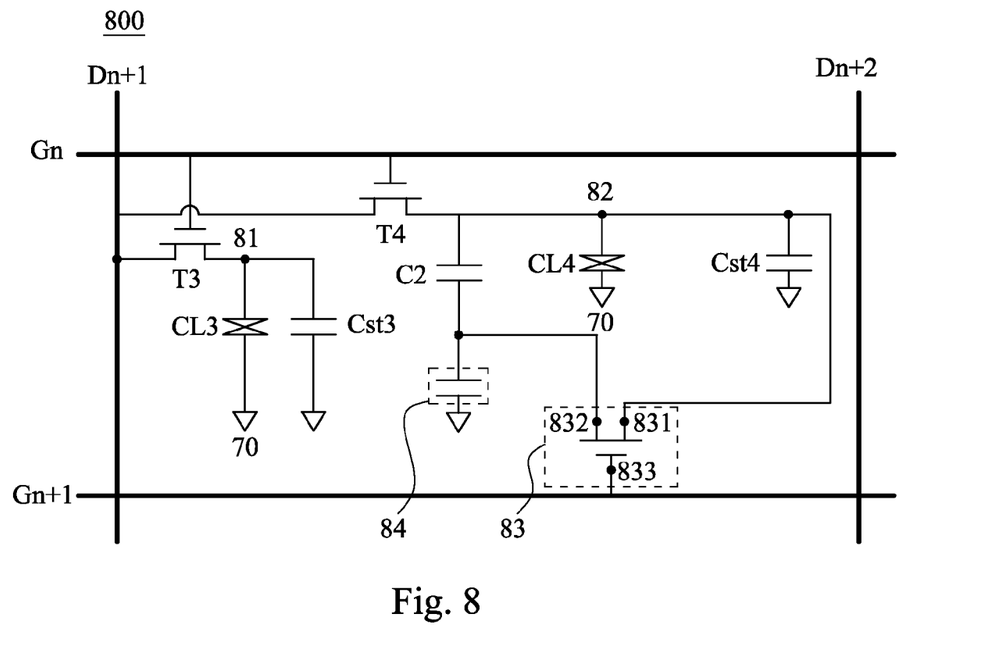
FIG. 8 is a schematic circuit diagram illustrating a sub-pixel according to another embodiment of the present disclosure.

Referring to FIG. 7 and FIG. 8, FIG. 8 is a schematic circuit diagram illustrating a sub-pixel 800 according to another embodiment of the present disclosure, in which the sub-pixel is configured for displaying a red color or a green color. Similarly, the sub-pixel 800 is a sub-pixel of one pixel on the foregoing liquid crystal array. The sub-pixel 800 is disposed on the liquid crystal layer 70. In the present embodiment, in order to describe the sub-pixel 800 conveniently, the sub-pixel 800 is connected to the same gate line as the sub-pixel 700, but the present embodiment is not limited in this regard.

As shown in FIG. 8, the sub-pixel 800 includes a first display electrode 81, a second display electrode 82, a second switch unit 83, a transistor T3, and a transistor T4. The first display electrode 81 is disposed on the liquid crystal layer 70 so as to form the first display region. A liquid crystal capacitor CL3 is formed between the first display electrode 81 and the liquid crystal layer 70, i.e., the first display electrode 81 is coupled to the liquid crystal layer 70 through the liquid crystal capacitor CL3 . The first display electrode 81 is also electrically coupled to a storage capacitor Cst3. The second display electrode 82 is disposed on the liquid crystal layer 70 so as to form the second display region. A liquid crystal capacitor CL4 is formed between the second display electrode 82 and the liquid crystal layer 70, i.e., the second display electrode 82 is coupled to the liquid crystal layer 70 through the liquid crystal capacitor CL4 . The second display electrode 72 is also electrically coupled to a capacitor C2 and a storage capacitor Cst4.

The second switch unit 83 includes a first end 831, a second end 832, and a control end 833. The first end 831 of the second switch unit 83 is electrically coupled to the second display electrode 82 of the sub-pixel 800. The second end 732 is electrically coupled between the capacitor C2 and a capacitor 84, in which the capacitance of the capacitor 84 is fixed (e.g., the metal capacitor). The control end 833 is electrically coupled to the gate line Gn+1. The source end of the transistor T3 is electrically coupled to the data line Dn+1. The drain end of the transistor T3 is electrically coupled to the first display electrode 81. The gate end of the transistor T3 is electrically coupled to the gate line Gn. The source end of the transistor T4 is electrically coupled to the data line Dn+1. The drain end of the transistor T4 is electrically coupled to the second display electrode 82 and the capacitor C2. The gate end of the transistor T4 is electrically coupled to the gate line Gn.

Similar to the operation for the sub-pixel 700, when the gate line Gn is enabled, the transistors T3 and T4 are turned on and receive a second data voltage through the data line Dn+1. Next, the first voltage is provided to the liquid crystal capacitor CL3 of the first display region (i.e., the liquid crystal capacitor CL3 coupled to the first display electrode 81) and the storage capacitor Cst3 and the third voltage is provided to the liquid crystal capacitor CL4 of the second display region (i.e., the liquid crystal capacitor CL4 coupled to the second display electrode 82) and the storage capacitor Cst4 according to the second data voltage. When the gate line Gn+1 is enabled, the second switch unit 83 is turned on such that the second display electrode 82 is coupled to the liquid capacitor 84 and discharge is proceeded. Therefore, the charges stored in the liquid crystal capacitor CL3 and the storage capacitor Cst3 are shared into the liquid crystal capacitor 84, and the third voltage of the second display region is reduced.

It is noted that the voltage provided to the first display region and the second display region of the large gray scale pixel is larger than the voltage provided to the first display region and the second display region of the low gray scale pixel. Moreover, the arrangement of the liquid crystal molecules in the liquid crystal layer 70 close to the second display electrodes 72 and 82 will vary with the variation of the provided voltage, i.e., the permittivity of the liquid crystal layer 70 will vary with the variation of the provided voltage. Specifically, the permittivity of the liquid crystal layer 70 increases when the provided voltage increase (i.e., the gray scale value of the pixel increases). Furthermore, the capacitance of the liquid crystal capacitor is directly proportional to the permittivity of the liquid crystal layer 70. Accordingly, the capacitance of the liquid crystal capacitor of the large gray scale pixel is larger than the capacitance of the liquid crystal capacitor of the low gray scale pixel.

Therefore, the capacitance of the liquid crystal capacitor 74 coupled to the first switch unit 73 can be enhanced by turning on the first switch unit 73 when the sub-pixel has a large gray scale value (in other words, the provided first voltage is larger than the predetermined voltage). Next, the charges shared into the liquid crystal capacitor 74 are larger, in which the charges are stored in the liquid crystal capacitor CL2 and the storage capacitor CsT2 of the sub-pixel 700, such that the reduction of the second voltage of the second display region is larger when the charges are shared (since the second voltage when the pixel has a large gray scale value is larger than the second voltage when the pixel has a low gray scale value). However, since the capacitance of the capacitor 84 (e.g., the metal capacitor) of the sub-pixel 800 is fixed, the charges shared into the capacitor 84 keep stable when the provided voltage is increased, in which the charges are stored in the liquid crystal capacitor CL4 and the storage capacitor Cst4 of the sub-pixel 800. In other words, regardless of whether the pixel has a large gray scale value or a low gray scale value, the range of the reduction of the third voltage provided to the second display region remains stable when the charges are shared.

When the first voltage provided to the first display region of the sub-pixel 700 and 800 is large, the reduction of the second voltage of the second display region of the sub-pixel 700 will increase and the reduction of the third voltage of the second display region of the sub-pixel 800 remains invariable. Accordingly, the difference between the second voltage of the second display region of the sub-pixel 700 (e.g., the blue sub-pixel) and the third voltage of the second display region of the sub-pixel 800 (e.g., the red sub-pixel or green sub-pixel) becomes larger such that the difference between the luminance of the red sub-pixel or green sub-pixel at an oblique view and the luminance of the blue sub-pixel at an oblique view becomes smaller such that a condition in which the image is partially yellow-green at an oblique view when the pixel has a large gray scale value is improved.

Moreover, since the sub-pixel 700 uses the liquid crystal capacitor rather than the capacitor 84 (e.g., the metal capacitor) of the sub-pixel 800, the aperture ratio of the sub-pixel 700 is enhanced (since the liquid crystal capacitor can contribute to luminance while the metal capacitor fails to contribute to luminance). Furthermore, the difference between the first display region and the second display region of the sub-pixel 700 can be determined according to the ratio of the area of the liquid crystal capacitor CL2 to the area of the liquid crystal capacitor 74.

In other words, the second voltage can be adjusted by the difference between the structure of the sub-pixel 700 (e.g., the blue sub-pixel) and the structure of the sub-pixel 800 (e.g., the red sub-pixel or green sub-pixel) such that the second voltage provided to the second display region of the blue sub-pixel is smaller than the third voltage provided to the second display region of the red sub-pixel or green sub-pixel. The foregoing method for adjusting the second voltage is one embodiment of the present disclosure, and the present disclosure is not limited thereto.

Moreover, in order to avoid over-adjusting the difference between the second voltage of the second display region of the first sub-pixel and the third voltage of the second display region of the second sub-pixel, the present disclosure further discloses a method for adjusting the second voltage within a range.

Figure 9A:
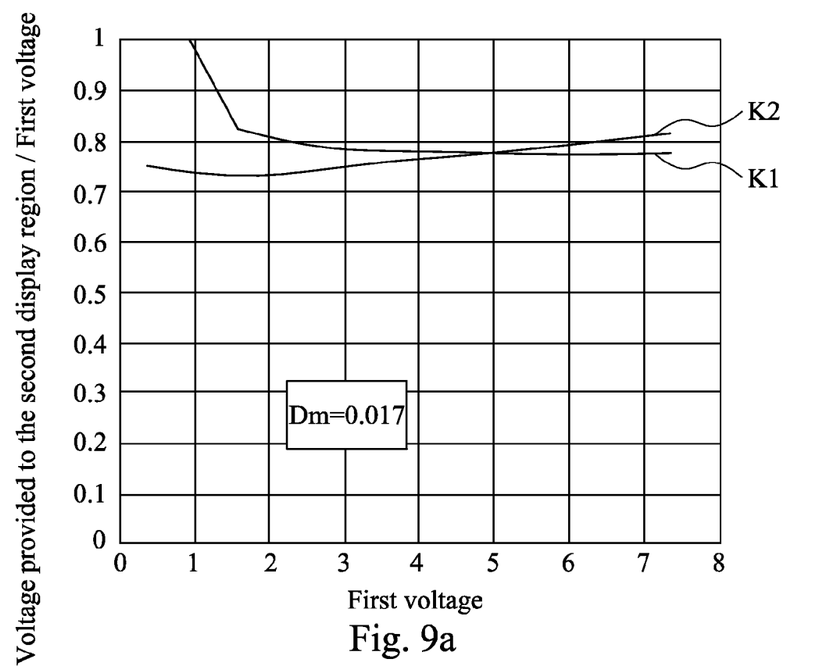
FIG. 9a is a diagram illustrating a curve K1 and a curve K2 in FIG. 5 when Dm=0.017.
Figure 9B:
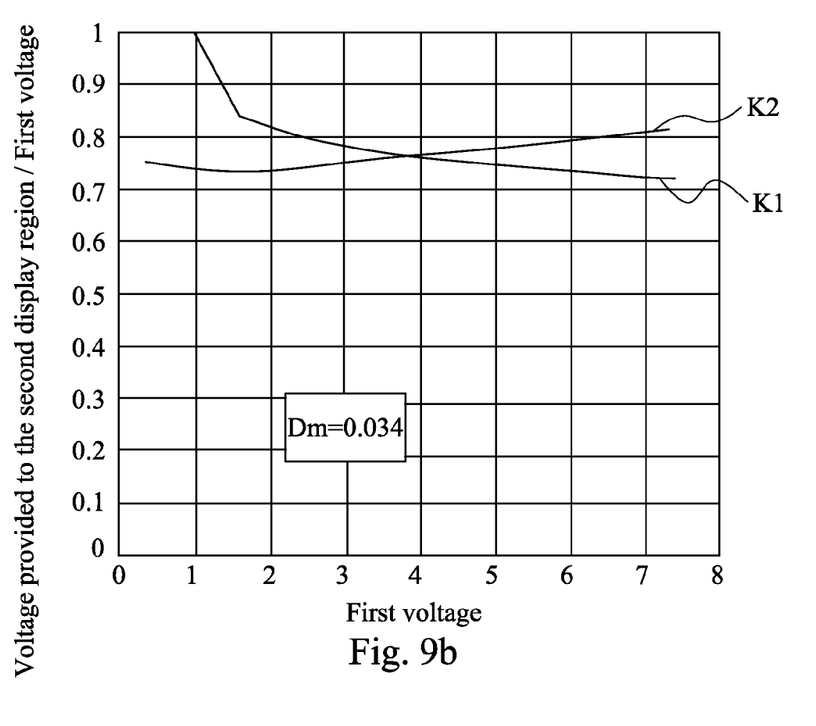
FIG. 9b is a diagram illustrating the curve K1 and the curve K2 in FIG. 5 when Dm=0.034.
Figure 9C:
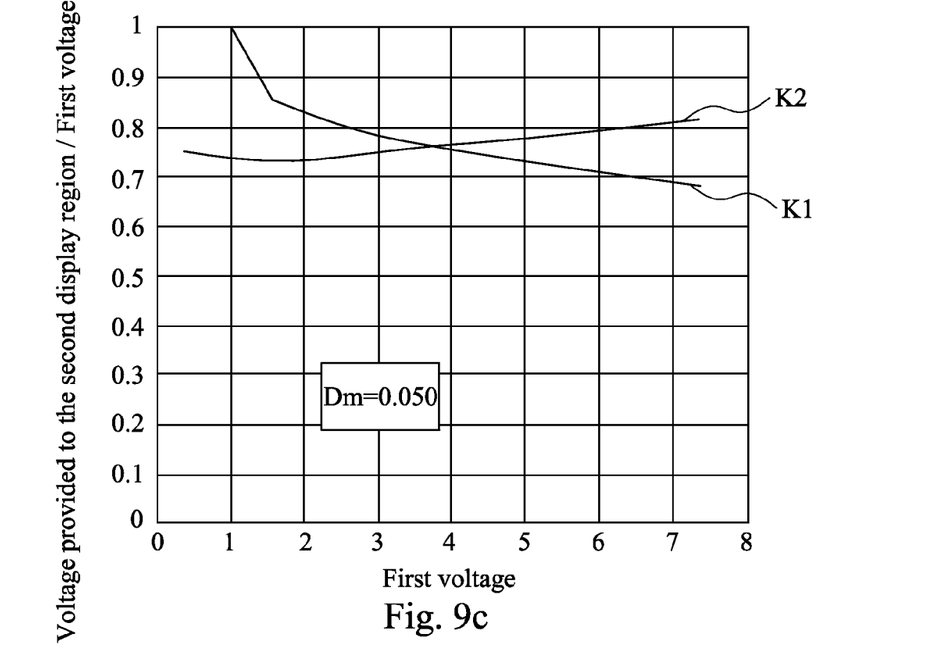
FIG. 9c is a diagram illustrating the curve K1 and the curve K2 in FIG. 5 when Dm=0.05.
Figure 9D:
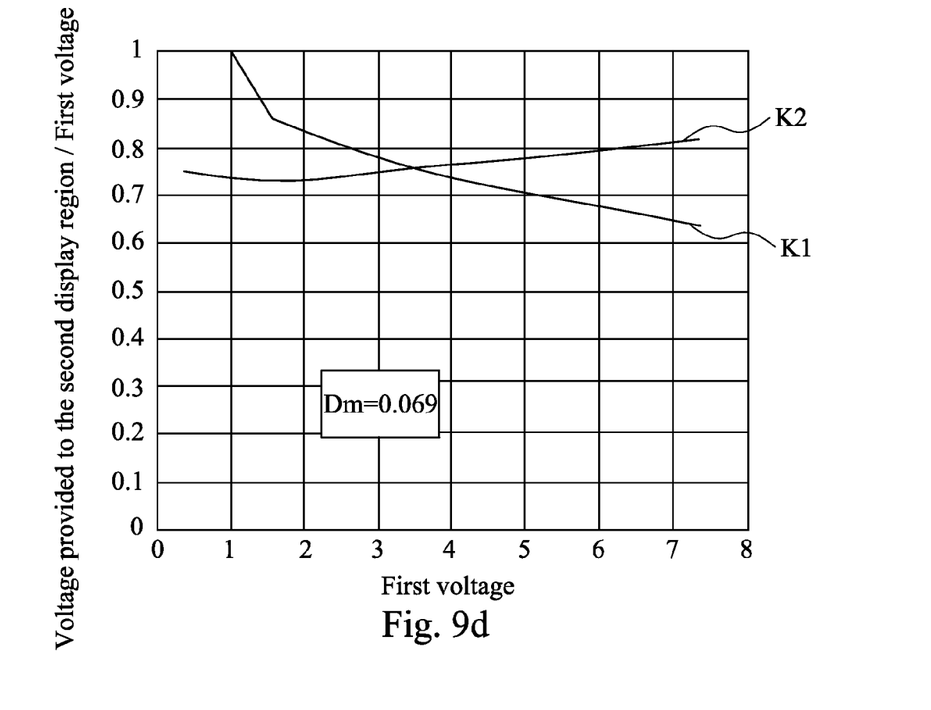
FIG. 9d is a diagram illustrating the curve K1 and the curve K2 in FIG. 5 when Dm=0.069.
Figure 10A:
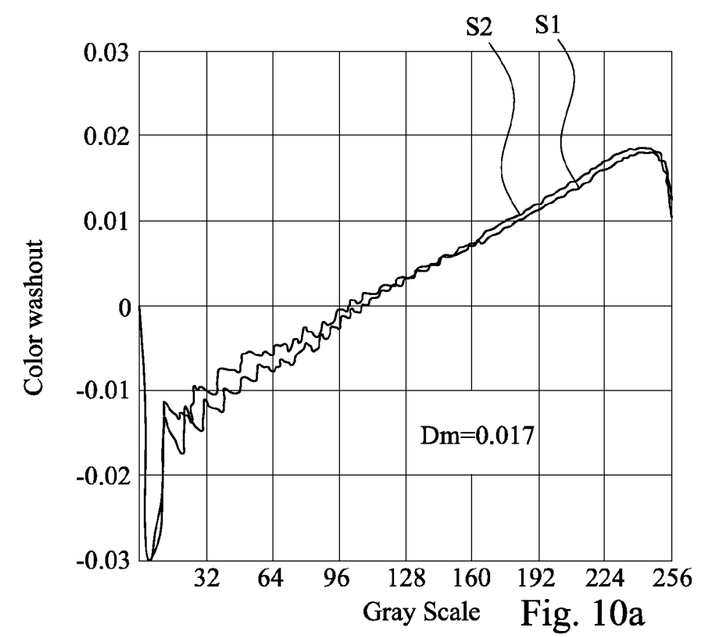
FIG. 10a is a diagram illustrating a relation between color washout and gray scale value when dm=0.017.
Figure 10B:
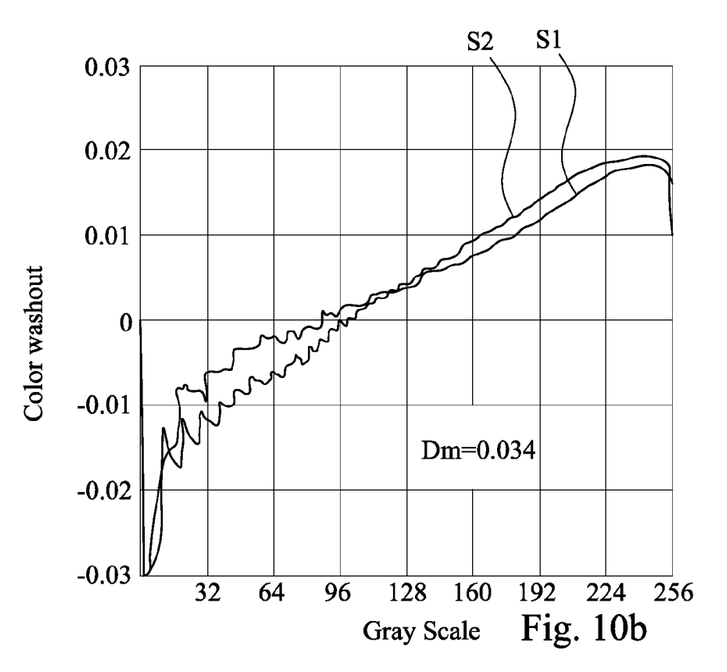
FIG. 10b is a diagram illustrating a relation between color washout and gray scale value when dm=0.034.
Figure 10C:
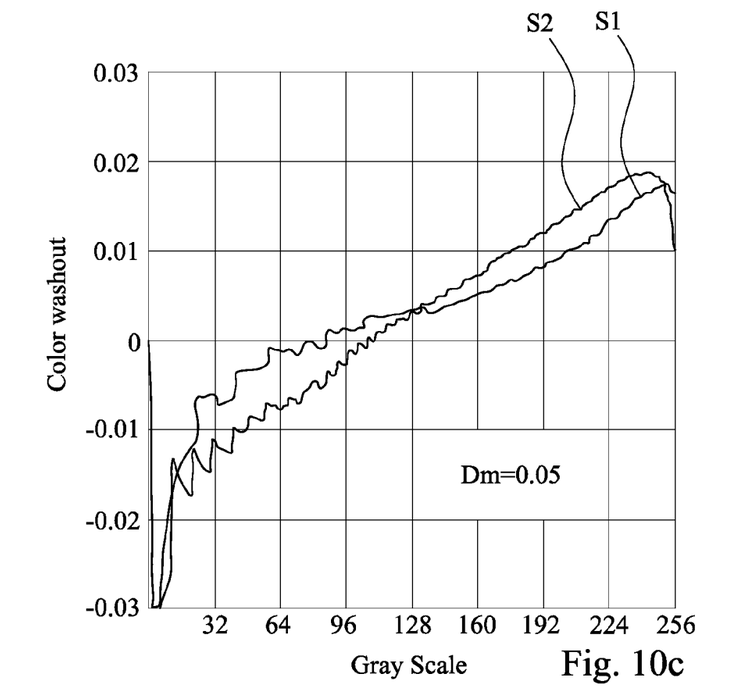
FIG. 10c is a diagram illustrating a relation between color washout and gray scale value when dm=0.05.
Figure 10D:
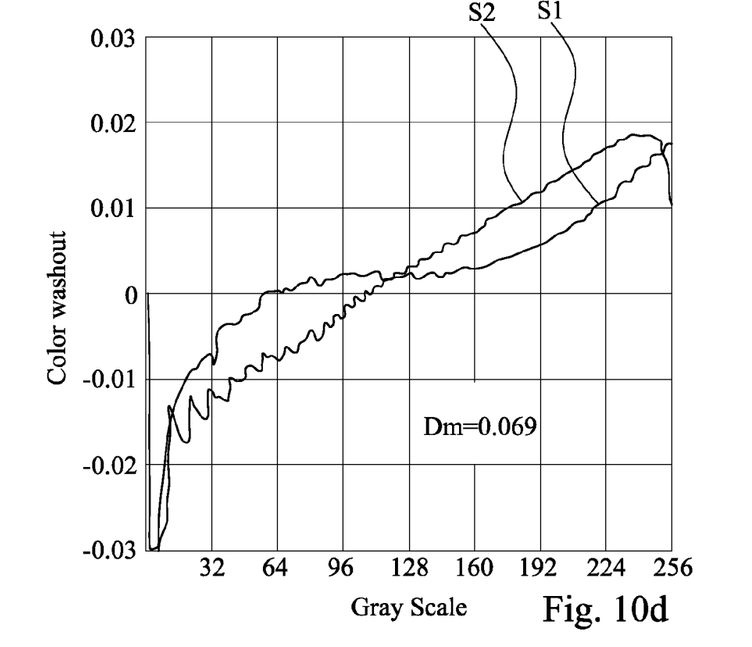
FIG. 10d is a diagram illustrating a relation between color washout and gray scale value when dm=0.069.

Reference is now made to FIG. 9a to FIG. 9d, and FIG. 10a to FIG. 10d. FIG. 9a is a diagram illustrating the curve K1 and the curve K2 in FIG. 5 when Dm=0.017. FIG. 9b is a diagram illustrating the curve K1 and the curve K2 in FIG. 5 when Dm=0.034. FIG. 9c is a diagram illustrating the curve K1 and the curve K2 in FIG. 5 when Dm=0.05. FIG. 9d is a diagram illustrating the curve K1 and the curve K2 in FIG. 5 when Dm=0.069. FIG. 10a is a diagram illustrating a relation between the color washout and the gray scale value when dm=0.017. FIG. 10b is a diagram illustrating a relation between color washout and gray scale value when dm=0.034. FIG. 10c is a diagram illustrating a relation between color washout and gray scale value when dm=0.05. FIG. 10d is a diagram illustrating a relation between color washout and gray scale value when dm=0.069. Dm=M2−M1, in which M1 represents the slope of the curve K1 (e.g., the blue sub-pixel) and M2 represents the slope of the curve K2 (e.g., the red sub-pixel or green sub-pixel). In FIG. 10a to FIG. 10d, the curve S1 illustrates a relation between color washout of the blue sub-pixel at an oblique view (45 degrees) according to one embodiment of the present disclosure. The curve S2 illustrates a relation between the color washout of the conventional blue sub-pixel at an oblique view (45 degrees). The vertical axis presents the color washout of the pixel with different gray scale values.

As shown in FIG. 9a to FIG. 9d, the larger Dm, the larger the difference between the slope M2 of the curve K2 and the slope M1 of the K1. In other words, the second voltage provided to the second display region of the blue sub-pixel is smaller than the third voltage provided to the second display region of the red sub-pixel or green sub-pixel. In FIG. 10a, when the pixel has the a large gray scale value (e.g., the gray scale value is 160) and Dm=0.017, the color washout of the curve S1 is improved slightly (compared to the curve S2). Moreover, in FIG. 10a to FIG. 10d, when Dm is large, the color washout of the curve S1 approaches to zero (i.e., no color washout). As shown in FIG. 10d, when Dm=0.069, the color washout of the curve S1 (i.e., the blue sun-pixel) is more close to zero. In other words, when the reduction of the second voltage provided to the second display region of the blue sub-pixel is larger than the reduction of the third voltage provided to the second display region of the red sub-pixel or green sub-pixel, a condition in which the image is partially yellow-green at an oblique view can be improved.

However, the value of Dm can be increased without limitation. In other words, the difference between the second voltage provided to the second display region of the blue sub-pixel and the third voltage provided to the second display region of the red sub-pixel or green sub-pixel may be within a range. As shown in FIG. 10c and FIG. 10d, although the curve S1 in FIG. 10d is more close to the horizontal axis than the curve S1 in FIG. 10c, the curve S1 in FIG. 10d tends to be concaved. If Dm keeps on increasing (e.g., Dm>0.069), the concave will be more severe. Specifically, although a condition in which the image is partially yellow-green is improved when the pixel is with a large gray scale range, the original image displayed by the liquid crystal display may be negatively affected. Accordingly, in the present disclosure, the preferred difference of the slope (Dm=M2−M1) is between 0.017 and 0.069.

As illustrated from the aforementioned embodiments of the present disclosure, a single shift register stage of the gate driver circuit can output two gate driving signals with various time sequences such that it is unnecessary to configure an extra shift register stage. Moreover, since the pull-up unit of the shift register in the present disclosure outputs the gate driving signals through two transistors of the output unit rather than outputting the gate driving signals directly, the layout area of the pull-up unit can be reduced. Accordingly, the layout design of the gate driver circuit is simplified and the parasitic capacitance becomes smaller such that the rising time and falling time of the clock signal are reduced and the transmitting speed of the signal is increased.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

The pixel driving method is configured for adjusting the second voltage according to one embodiment of the present disclosure such that the second voltage provided to the second display region of the blue sub-pixel is smaller than the third voltage provided to the second display region of the red sub-pixel or green sub-pixel, whereby a condition which is the image is partially yellow-green at an oblique view can be improved when the foregoing pixels have large gray scale values. Moreover, the present disclosure further discloses that the relation between the ratio of the second voltage to the first voltage and the ratio of the third voltage to the first voltage may be within a range when the second voltage is adjusted in order to avoid the image from being affected when the pixel has a low or middle gray scale value. In one embodiment of the present disclosure, the preferred value of Dm is between 0.017 and 0.069.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A pixel driving method, for driving a pixel, wherein the pixel comprises a first sub-pixel and a second sub-pixel, and each of the first sub-pixel and the second sub-pixel comprises a first display region and a second display region, the pixel driving method comprising:

providing a first voltage to the first display regions of the first sub-pixel and the second sub-pixel;

providing a second voltage to the second display region of the first sub-pixel, and providing a third voltage to the second display region of the second sub-pixel, wherein when the first voltage is smaller than a predetermined voltage, the second voltage is equal to the third voltage; and the second voltage is smaller than the third voltage when the first voltage is larger than or equal to the predetermined voltage, wherein a relation between the second voltage and the third voltage conforms to:

$$0.017 < (Dm = M2 - M1) < 0.069,$$

where M2 represents a variation of a ratio value of the third voltage to the first voltage when the first voltage has a corresponding variation, and M1 represents a variation of the ratio value of the second voltage provided to the first sub-pixel to the first voltage when the first voltage has the corresponding variation.

2. The pixel driving method as claimed in claim 1, wherein $$M2 = \frac{(y22 - y21)}{(x2 - x1)}$$

and $$M1 = \frac{(y12 - y11)}{(x2 - x1)},$$

where y22 represents the ratio of the third voltage provided to the second sub-pixel to the first voltage while the first voltage is x2, y21 represents the ratio of the third voltage provided to the second sub-pixel to the first voltage when the first voltage is x1, y12 represents the ratio of the second voltage provided to the first sub-pixel to the first voltage when the first voltage is x2, and y12 represents the ratio of the second voltage provided to the first sub-pixel to the first voltage when the first voltage is x1.

3. The pixel driving method as claimed in claim 1, wherein a voltage value of the predetermined voltage is configured such that the pixel has a predetermined gray scale value at 160.

4. The pixel driving method as claimed in claim 1, wherein the first sub-pixel is configured for displaying blue.

5. The pixel driving method as claimed in claim 1, wherein the first sub-pixel is configured for displaying one of red or green.

6. The pixel driving method as claimed in claim 1, wherein the first voltage and the second voltage are configured such that the first display region and the second display region of the first sub-pixel display a plurality of corresponding gray scales, and the first voltage and the third voltage are configured such that the first display region and the second display region of the second sub-pixel display the corresponding gray scales.

7. A pixel array for a liquid crystal display apparatus, electrically coupled to a plurality of gate lines and a plurality of data lines, wherein the pixel array is disposed close to a liquid crystal layer, the pixel array comprising:
a plurality of pixels, each of the pixels comprising:
a first sub-pixel configured for displaying a blue color, comprising:
a first display electrode coupled to the liquid crystal layer;
a second display electrode coupled to the liquid crystal layer and a first capacitor, wherein when an N-th gate line is enabled, a first voltage and a second voltage are provided to the first display electrode and the second display electrode of the first sub-pixel, respectively, according to a first data voltage received by a corresponding data line; and
a first switch unit coupled to the liquid crystal layer and the second display electrode, wherein when an (N+1)th gate line is enabled, a plurality of charges of the second display electrode of the first sub-pixel are shared; and
a second sub-pixel, configured for displaying a red or green color, comprising:
a first display electrode coupled to the liquid crystal layer;
a second display electrode coupled to the liquid crystal layer and a second capacitor, wherein when the Nth gate line is enabled, another first voltage and a third voltage are provided to the first display electrode and the second display electrode of the second sub-pixel respectively according to a second data voltage received by the corresponding data line; and
a second switch unit coupled to a third capacitor and the second display electrode, wherein when the (N+1)th gate line is enabled, the charges of the second display electrode of the second sub-pixel are shared;
wherein when the first voltage is smaller than a predetermined voltage, the second voltage is equal to the third voltage, and when the first voltage is larger than or equal to the predetermined voltage, the first switch unit is conducted and the second voltage is provided so that the second voltage is smaller than the third voltage,
wherein a relation between the second voltage and the third voltage conforms to:

$$0.017 < (Dm = M2 - M1) < 0.069,$$

where M2 represents a variation of a ratio value of the third voltage to the first voltage when the first voltage has a corresponding variation, and M1 represents a variation of the ratio value of the second voltage provided to the first sub-pixel to the first voltage when the first voltage has the corresponding variation.

8. The pixel array as claimed in claim 7, wherein the first sub-pixel comprises:
a first transistor comprising a source end, a drain end, and a gate end, wherein the source end of the first transistor is electrically coupled to the corresponding data line, the drain end of the first transistor is electrically coupled to the first display electrode, and the gate end of the first transistor is electrically coupled to the Nth gate line; and
a second transistor, comprising a source end, a drain end, and a gate end, wherein the source end of the second transistor is electrically coupled to the corresponding data line, the drain end of the second transistor is electrically coupled to the second display electrode, and the gate end of the second transistor is electrically coupled to the (N+1)th gate line.

9. The pixel array as claimed in claim 7, wherein the first switch unit comprises a first end, a second end, and a control end, wherein the first end of the first switch unit is electrically coupled to the second display electrode of the first sub-pixel, the second end of the first switch unit is electrically coupled to the liquid crystal layer and the first capacitor, and the control end of the first switch unit is electrically coupled to the (N+1)th gate line.

10. The pixel array as claimed in claim 7, wherein the second sub-pixel comprises:
a first transistor comprising a source end, a drain end, and a gate end, wherein the source end of the first transistor is electrically coupled to the corresponding data line, the drain end of the first transistor is electrically coupled to the liquid crystal layer, and the gate end of the first transistor is electrically coupled to the Nth gate line; and
a second transistor comprising a source end, a drain end, and a gate end, wherein the source end of the second transistor is electrically coupled to the corresponding data line, the drain end of the second transistor is electrically coupled to the liquid crystal layer and the second capacitor, and the gate end of the second transistor is electrically coupled to the Nth gate line;
wherein the second switch unit comprises a first end, a second end, and a control end, wherein the first end of the second switch unit is electrically coupled to the second display electrode of the first sub-pixel, the second end of the second switch unit is electrically coupled between the second capacitor and the third capacitor, and the control end of the second switch unit is electrically coupled to the (N+1)th gate line.

* * * * *